(No Model.)

K. HALL.
COTTON PLANTER.

No. 275,380. Patented Apr. 10, 1883.

Attest.
Sidney P. Hollingsworth
Newton Wyckoff

Inventor.
Kennedy Hall
By his Attorney,
Philip T. Dodge.

UNITED STATES PATENT OFFICE.

KENNEDY HALL, OF HURRICANE, ARKANSAS.

COTTON-PLANTER.

SPECIFICATION forming part of Letters Patent No. 275,380, dated April 10, 1883.

Application filed September 26, 1882. (No model.)

*To all whom it may concern:*

Be it known that I, KENNEDY HALL, of Hurricane, in the county of Saline and State of Arkansas, have invented certain Improvements in Cotton-Planters, of which the following is a specification.

My invention relates to that class of cotton-planters in which rolling hoppers are arranged to travel behind the hoes or shovels by which the furrow is opened; and the invention consists in various peculiarities of construction, which will be hereinafter described.

Figure 1:
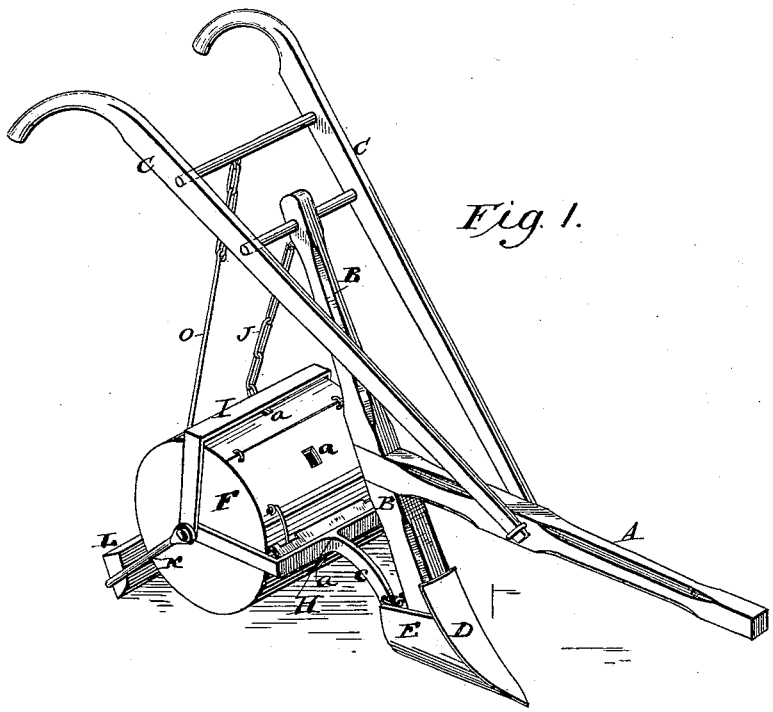
Figure 2:
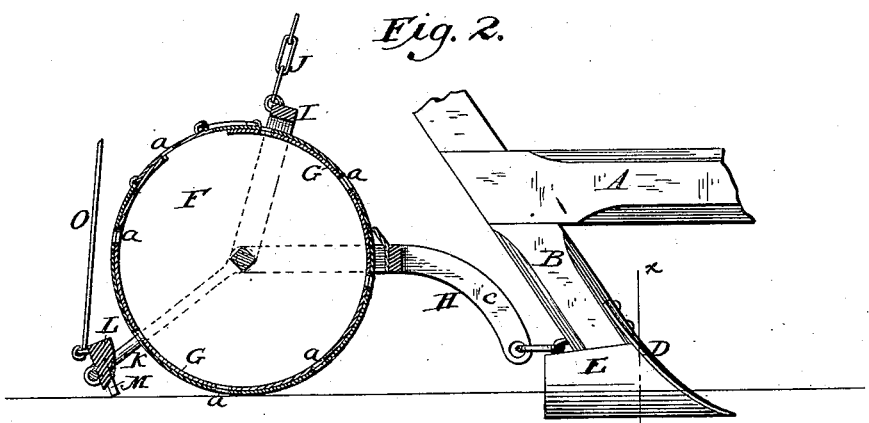
Figure 3:
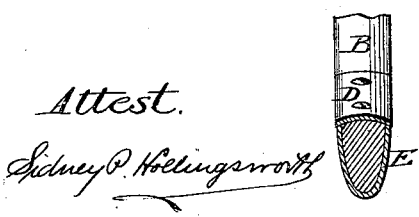
Figure 4:
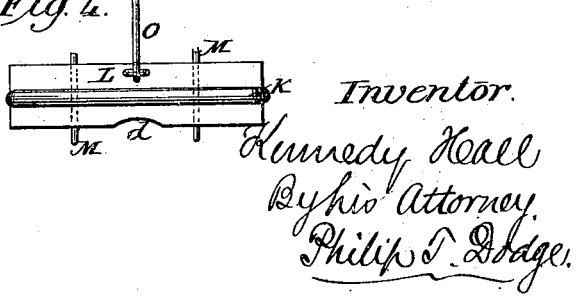

Referring to the accompanying drawings, Figure 1 represents a perspective view of my improved machine. Fig. 2 is a vertical longitudinal section through the lower portion of the same on a central line. Fig. 3 is a cross-section on the line *x x*, Fig. 2. Fig. 4 is a rear view of the drag or furrow-closing device.

Referring to the drawings, A represents a horizontal draft-beam, and B an upright inclined standard secured rigidly to the rear end of said beam, and C C two handles attached to the beam and standard for the purpose of enabling the operator, who walks behind the machine, to guide and control the same, as usual in this class of implements.

D represents a pointed shovel secured to the lower end of the standard B for the purpose of opening the furrow in which the seed is to be deposited.

E represents a shoe or sole-piece, of a U form in cross-section, secured rigidly to the bottom or lower end of the standard, and extending backward a considerable distance in rear of the shovel D. This shoe or sole-piece, which is adjusted to run in the bottom of the furrow produced by the shovel, is designed to compact and render smooth the bottom of the furrow, and also serves as a support to prevent the shovel from running too deeply into the ground. The shoe, being extended backward beyond the standard, as shown, and thus made of considerable length, also answers the additional function of a support or fulcrum upon which the standard may be rocked by depressing the handles C so as to throw the point of the shovel D upward. By this rocking motion the operator is enabled to control easily and perfectly the depth to which the shovel enters the ground, and to cause the same to ride out of the ground when required. The peculiar important characteristic of my shoe E consists in the fact that it has a sectional form corresponding exactly with the marginal form of the shovel D, and that its lower side is in line horizontally with the point of the shovel. In other words, the surface of the shoe E forms a backward continuation of the edges of the shovel, the edge of the shovel and the surface of the shoe being flush with each other. This arrangement prevents the shovel from running deeply, as would be the case were the shoe carried below its point, and, on the other hand, it secures a smoothness of the furrow which could not be attained were the shoe carried below the shovel.

F represents a cylindrical hopper consisting simply of a hollow wooden or sheet-metal body located in rear of the standard and arranged to roll upon the surface of the ground. The hopper is provided in its periphery with a series of central openings, *a*, at uniform distances apart, through which the seed escapes intermittingly.

For the purpose of adjusting the size of the seed-openings and determining the quantity of seed deposited at each discharge, I place within the hopper a sheet-metal slide, G, encircling its interior, and provided with holes corresponding in number and location with the outlets *a*. By giving this slide a circular adjustment within the hopper it will be caused to close the openings *a* to a greater or less extent, as may be required. The hopper is caused to travel behind the standard, and is guided and held in position by means of a forked bail or stirrup, H, having two arms which engage with the respective journals of the hopper, and also a third forwardly-extending arm, *c*, which is curved forward and downward, and attached, by means of a link or other swivel-connection, to the standard B, near its foot. The bail thus connected causes the drum to follow directly behind the standard, over the furrow, but at the same time permits it to tip or rock freely, in order that it may follow the undulations in the surface. The connection of the bail or stirrup H to the standard at its extreme lower end is a feature of decided importance, for the reason that I thus avoid the lateral play or movement which would be imparted thereto were the connection made at a higher point on the standard, which in action receives unavoidably more or less side motion.

For the purpose of enabling the operator to lift the hopper from the ground, and otherwise to control the same as may be required, I attach loosely to its journals a second bail or stirrup, I, which is connected, by a chain or other flexible connection, J, to the upper end of the standard B, as shown. The chain is made of such length as to permit the hopper to follow the surface of the ground, under ordinary circumstances, when the machine is in action; but when the handles are elevated by the operator above their ordinary position the chain will lift the hopper clear of the ground.

For the purpose of covering the seed deposited in the furrow, I attach loosely to the journals of the hopper a third bail, K, extending backward and carrying a cross-bar or drag, L, provided with two vertically-adjustable teeth or points, M, as clearly represented in Figs. 2 and 3. The drag is rounded on the forward surface, and is somewhat cut away at the center, as shown at d, in order to permit the earth to be accumulated above the seed by the action of the teeth M, which are arranged to travel on opposite sides of the furrow. The teeth M are passed through the drag and are adjustable vertically therein, being held either by friction alone, or by nuts or equivalent fastening devices, if required. For the purpose of limiting the descent of this drag, and to lift the same clear of the ground when turning the machine or moving the same from place to place, a chain, rod, or equivalent flexible connection, O, is extended from the drag-bar to one of the cross-bars by which the handles are connected, as shown in Figs. 1 and 2.

In the operation of the machine a furrow formed by the shovel D is rendered smooth and uniform by the use of the sole-piece E. The hopper F, following behind, deposits the seed in the furrow and also assists in covering the same with earth. The drag or scraper L, with its teeth M, following behind, serves to turn the earth inward effectually over the seed and leave the same in a condition favorable to germination. A scraper-blade applied to the bail H removes adhering earth from the hopper.

Having thus described my invention, what I claim is—

1. In combination with a draft-frame having a standard, B, a furrow-opening shovel, D, a cylindrical gravitating hopper, F, arranged to roll directly upon the surface of the ground, and a bail, H, connected with the journals of said roll, and having a single forwardly-entending arm jointed to the standard B, at its lower end, as described, whereby the drum is permitted to move freely in all directions and follow the undulations or inequalities in the surface of the ground.

2. In a cotton-planter, the draft-frame, its standard, and shovel, in combination with the hopper arranged to roll upon the surface of the ground, the bail H, having a single connection with the frame, the chain J to limit the descent of the drum, the independent scraper L, having its arms mounted on the journals of the drum, and the devices O, whereby the scraper may be adjusted independently of the drum.

3. In a cotton-planter, the combination of the draft-frame, the rolling hopper attached to said frame by means substantially as described, and adapted to rise and fall independently thereof, and an independently-movable drag or scraper, L, consisting of a transverse round bar provided with the teeth N, as described.

KENNEDY HALL.

Witnesses:
H. R. BIZZELL,
G. R. TOWNSEND.